United States Patent
Tajima

(10) Patent No.: US 6,678,407 B1
(45) Date of Patent: Jan. 13, 2004

(54) METHOD AND DEVICE OF LIGHT SOURCE DISCRIMINATION, SKIN COLOR CORRECTION, AND COLOR IMAGE CORRECTION, AND STORAGE MEDIUM THEREOF CAPABLE OF BEING READ BY COMPUTER

(75) Inventor: Johji Tajima, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/282,217

(22) Filed: Mar. 31, 1999

(30) Foreign Application Priority Data

Mar. 31, 1998 (JP) .......................................... 10-086657

(51) Int. Cl.$^7$ .............................. G06K 9/00; G03F 3/08
(52) U.S. Cl. ...................... 382/167; 382/118; 382/165; 358/518; 358/523
(58) Field of Search .............................. 382/118, 124, 382/165, 167, 164, 190, 103, 156, 115, 162; 358/515, 518, 523, 527

(56) References Cited

U.S. PATENT DOCUMENTS

| | | | | |
|---|---|---|---|---|
| 5,128,708 A | * | 7/1992 | Murayama et al. | ......... 354/430 |
| 5,142,642 A | * | 8/1992 | Sudo | ........................... 358/88 |
| 5,210,600 A | * | 5/1993 | Hirata | ......................... 358/76 |
| 5,874,988 A | * | 2/1999 | Gu | ............................... 382/167 |
| 5,900,860 A | * | 5/1999 | Ueda | ........................... 345/150 |
| 6,061,153 A | * | 5/2000 | Sugita | |

OTHER PUBLICATIONS

Kawakami et al. "Detection of Face Image Based on Face Structure Model", 37th Information Processing Society National Convention; 1988; pp. 1508–1509.

Miyakawi et al. "Area Division of Color Image Using Color Information", Electronic Information Communication Society Research Report; IE89–50; 1989; pp. 43–48.

* cited by examiner

Primary Examiner—Andrew W. Johns
Assistant Examiner—Amir Alavi
(74) Attorney, Agent, or Firm—Foley & Lardner

(57) ABSTRACT

A method and a device of light source discrimination, skin color correction, and color image correction, and storage medium thereof capable of being read by a computer always enable reproducibility, of color to be maintained highly regardless of difference of light source. There is calculated color distribution of portion of a face or skin in image by color distribution calculation section. There is compared the color distribution with distribution of skin color taken photograph under respective light sources stored in reference color distribution storage section. A light source discrimination section discriminates the light source at the time of taking photograph. There is corrected color by converting color under the light source of candidate substance into a corresponding color under standard light source.

35 Claims, 9 Drawing Sheets

METHOD AND DEVICE OF LIGHT SOURCE DISCRIMINATION, SKIN COLOR CORRECTION, AND COLOR IMAGE CORRECTION, AND STORAGE MEDIUM THEREOF CAPABLE OF BEING READ BY COMPUTER

BACKGROUND OF THE INVENTION

The present invention relates to a method and a device of light source discrimination, skin color correction, and color image correction, and storage medium thereof capable of being read by a computer. More to particularly, this invention relates to a method and a device of light source discrimination, skin color correction, and color image correction, and storage medium thereof capable of being read by a computer which are intended to correct color in a color image based on skin area in a color image.

DESCRIPTION OF THE PRIOR ART

When there is displayed color image inputted by a color image input device such as video camera, digital camera, and so forth to a computer screen and so forth, in many cases, color reproduction is insufficient (color representation gives a sense of incompatibility to persons). In particular, when a face of person is included in image, requirement in terms of accuracy of color reproduction is severe. By way of problem often occurs, in some cases, image is reproduced in a different color from original color because there is taken photograph under different light source such as a fluorescent light from daylight which is original light for this photograph. Formerly, there is known a computer software in order to correct such image to a natural color representation, that is known by way of a photo retouch software.

In such the software, for instance, there is an image whose green component is exceedingly increased because it is taken photograph under the fluorescent light. Concerning this image, there is implemented a conversion based on curved line as shown in FIG. 1, toward respective three primary color components of red (R), green (G), and blue (B) for the color image, thus an operator corrects color in accordance with his experience, while suppressing green component, and increasing red component. Consequently, RGB value (horizontal axis) of input is converted into R'G'B' value (vertical axis) of output. Further, there is known a software enabling such empirical correction processing to be simply realized in certain degree by only an amateur.

However, the conventional image processing (color correction) implemented as described above is known content as it is by way of know-how. The operator should specify content of processing. The content of processing was determined in accordance with the know-how of the operator or the sense of the operator. There is the problem that reproducibility of color is low, because it is incapable of being unnecessary to be executed the processing with appropriate content. Concretely, there are following matters depending on those problems.

Firstly, there can not be implemented appropriate color correction in terms of the image given previously, because processing itself (operation) depends on sensitive ability of person.

Secondly, since processing itself (operation) depends on sensitive ability of person, different result occurs in every operator.

Lastly, for instance, when there is used the software in order to correct green excessive image, the result of correction is different in every operator, because the operator judges whether or not the image is green excessive image, in accordance with his sense about how much degree, and inputs the result thereof to the computer as an information.

SUMMARY OF THE INVENTION

In view of the foregoing, it is an object of the present invention, in order to overcome the above mentioned problems, to provide a method and a device of light source discrimination, skin color correction, and color image correction, and a storage medium capable of being read by a computer which enable reproducibility of color to be maintained always highly regardless of difference of light source.

PRINCIPLE OF COLOR CORRECTION

There will be described the principle of color correction in the present invention. There is taken spectral reflectance (reflectance in every each wavelength $\lambda$) of skin or a face to be $\alpha(\lambda)$. Spectral radiant intensity of a light source is taken to be $S(\lambda)$. Spectral sensitivity of three kinds of sensor of color image input device are taken to be $r(\lambda)$, $g(\lambda)$, $b(\lambda)$. At this time, there is represented outputs R, G, B, of respective sensors by formula 1.

$$\begin{cases} R = \int_{380}^{780} r(\lambda)\beta(\lambda)S(\lambda)d\lambda \\ G = \int_{380}^{780} g(\lambda)\beta(\lambda)S(\lambda)d\lambda \\ B = \int_{380}^{780} b(\lambda)\beta(\lambda)S(\lambda)d\lambda \end{cases} \quad \text{[FORMULA 1]}$$

Here, wavelength $\lambda$ is a value with nm as a unit.

Radiant intensity of daylight is taken to be $S1(\lambda)$, at this time, outputs of respective sensors are (R1, G1, B1). Radiant intensity of a fluorescent light is taken to be $S2(\lambda)$, at this time, outputs of respective sensors are (R2, G2, B2). Difference between these sensor outputs brings unnatural skin color. Generally, it is incapable of being discriminated whether radiant intensity of light source is $S1(\lambda)$ or $S2(\lambda)$ only seeing an image. However, skin is taken photograph in an image, and reflectance $\alpha(\lambda)$ is known. When the sensor output (R, G, B) equals to (R1, G1, B1), it is capable of being known that a light source is daylight. Similarly, when the sensor output (R, G, B) equals to (R2, G2, B2), it is capable of being known that a light source is a fluorescent light. Practically, reflectance $\alpha(\lambda)$ of skin which is different according to a person, is not constant. It is difficult that sensor output agrees therewith completely as above. However, it is possible to estimate a light source whose possibility is high, by checking distribution of sensor output in terms of skin color of respective light sources.

According to a first aspect of the present invention, in order to achieve the above-mentioned object, there is provided a light source discrimination method which comprises the steps of calculating color distribution of skin area of a color image, comparing the color distribution calculated previously in the above calculating step with a color distribution already known of skin taken photograph under a plurality of different lighting light sources, and discriminating a lighting light source under which the color image is taken photograph, based on result of the comparison.

According to a second aspect of the present invention, there is provided a light source discrimination device which comprises a color distribution calculation means for calculating color distribution of skin area of a color image, a reference color distribution storage means for storing therein color distribution of skin taken photograph under a plurality of different lighting light sources, and a light source discrimination means for discriminating lighting light source under which the color image is taken photograph, while comparing color distribution of skin area of the color image calculated by the color distribution calculation means with color distribution of skin under a plurality of lighting lights, which is stored in the reference color distribution storage means.

According to a third aspect of the present invention, there is provided a skin color correction method which comprises the steps of calculating color distribution of skin area of a color image, comparing color distribution calculated previously at the above calculating step with color distribution already known of skin taken photograph under a plurality of different lighting light sources, and correcting color of the skin area into a skin color under prescribed lighting light source based on result of the comparison.

According to a fourth aspect of the present invention, in the third aspect, there is provided a skin color correction method, wherein correction of color of the skin area is implemented based on result of discrimination while discriminating lighting light source under which the color image is taken photograph.

According to a fifth aspect of the present invention, in the third or fourth aspect, there is provided a skin color correction method, wherein it causes the skin area of the color image to be detected automatically.

According to a sixth aspect of the present invention, there is provided a color image correction method which comprises the steps of calculating color distribution of skin area of a color image, comparing the color distribution calculated previously at the calculating step with color distribution already known of skin taken photograph under a plurality of different lighting light sources, and correcting color of pixel in the color image into color under prescribed lighting light source based on the result of comparison.

According to a seventh aspect of the present invention, in the sixth aspect, there is provided a color image correction method, wherein correction of pixel in the color image is implemented based on result of discrimination, while discriminating lighting light source under which the color image is taken photograph.

According to an eighth aspect of the present invention, in the sixth or seventh aspect, there is provided a color image correction method, wherein it causes skin area of the color image to be detected automatically.

According to ninth aspect of the present invention, there is provided a skin color correction device which comprises a light source discrimination means for discriminating lighting light source at the time when the color image is taken photograph on the basis of color distribution of skin area of color image, a skin color storage means for storing therein skin color corresponding to a plurality of lighting light sources when skin is taken photograph under a plurality of different lighting light sources, and a skin color conversion means for converting a skin color of the skin area into a skin color read out from the skin color storage means, while reading out skin color under prescribed lighting light source corresponding to a skin color of the skin area, from the skin color storage means on the basis of result of discrimination of the light source discrimination means and a skin color of the skin area.

According to a tenth aspect of the present invention, there is provided a skin color correction device which comprises a light source discrimination means for discriminating lighting light source when a color image is taken photograph on the basis of color distribution of skin area of the color image a skin color output means for outputting a skin color under prescribed lighting light source of a skin color, while inputting result of discrimination of the light source discrimination means and the skin color of the skin area, and a skin color conversion means for converting a skin color of the skin area into a skin color outputted from the skin color output means.

According to an eleventh aspect of the present invention, there is provided a skin color correction device which comprises a light source discrimination means for discriminating lighting light source when a color image is taken photograph on the basis of color distribution of skin area of the color image a skin color calculation means for calculating skin color under prescribed lighting light source of the skin color on the basis of result of discrimination of the light source discrimination means and a skin color of the skin area, and a skin color conversion means for converting a skin color of the skin area into a skin color calculated by the skin color calculation means.

According to a twelfth aspect of the present invention, in any one of the ninth to eleventh aspect, there is provided a skin color correction device, further comprising a skin area detection means for detecting a skin area automatically from the color image.

According to a thirteenth aspect of the present invention, there is provided a color image correction device which comprises a light source discrimination device for discriminating lighting light source when a color image is taken photograph on the basis of color distribution of a skin area of the color image, a reference color storage means for storing therein color corresponding to a plurality of lighting light sources when a substance is taken photograph under a plurality of different lighting light sources, and a color conversion means for converting a color of pixel into a color read out from the reference color storage means, while reading out color under prescribed lighting light source corresponding to a color of the pixel, from the reference color storage means on the basis of result of discrimination of the light source discrimination means and a color of the pixel in the color image.

According to a fourteenth aspect of the present invention, there is provided a color image correction device which comprises a light source discrimination means for discriminating lighting light source when a color image is taken photograph on the basis of color distribution of skin area of the color image, a color output means for outputting color under prescribed lighting light source of the color, while inputting result of discrimination of the light source discrimination means and a color of pixel of the color image, and a color conversion means for converting a color of the pixel into a color outputted by the color output means.

According to a fifteenth aspect of the present invention, there is provided a color image correction device which comprises a light source discrimination means for discriminating lighting light source when a color image is taken photograph on the basis of color distribution of skin area of the color image, a color calculation means for calculating a color under prescribed lighting light source of the color on the basis of result of discrimination of the light source discrimination means and a color of pixel in the color image, and a color conversion means for converting a color of the pixel into a color calculated by the color calculation means.

According to a sixteenth aspect of the present invention, in any one of aspects 13 to 15, there is provided a color image correction device, further comprising a skin area detection means for detecting a skin area automatically from the color image.

According to a seventeenth aspect of the present invention, there is provided a storage medium which is capable of being read by a computer, storing therein a program for realizing a means for calculating color distribution of skin area of color image, a means for obtaining color distribution of skin taken photograph under a plurality of different lighting light source, and a means for discriminating lighting light source under which the color image is taken photograph while comparing a color distribution of a skin area of the color image calculated by the means for calculating with a color distribution of skin under a plurality of lighting light sources obtained by the means for obtaining.

According to an eighteenth aspect of the present invention, there is provided a storage medium which is capable of being read by a computer, storing therein a program for realizing a means for discriminating lighting light source when a color image is taken photograph on the basis of a color distribution of a skin area of the color image a means for obtaining skin colors corresponding to a plurality of different lighting light sources when skin is taken photograph under a plurality of different lighting light sources a means for converting a skin color of a skin area into a skin color received from the means for obtaining, while receiving a skin color under prescribed lighting light source corresponding to a skin color of the skin area from the means for obtaining on the basis of result of discrimination by the means for discriminating and a skin color of the skin area.

According to a nineteenth aspect of the present invention, there is provided a storage medium which is capable of being read by a computer, storing therein a program for realizing a means for discriminating lighting light source when a color image is taken photograph on the basis of a color distribution of a skin area of the color image, a means for outputting a skin color under prescribed lighting light source of a skin color, while receiving the result of discrimination by the means for discriminating and the skin color of the skin area, and a means for converting a skin color of the skin area into a skin color outputted by the means for outputting.

According to a twentieth aspect of the present invention, there is provided a storage medium which is capable of being read by a computer, storing therein a program for realizing a means for discriminating lighting light source when a color image is taken photograph on the basis of a color distribution of a skin area of the color image, a means for calculating a skin color under prescribed lighting light source of a skin color on the basis of result of discrimination by the means for discriminating and the skin color of the skin area, and a means for converting a skin color of the skin area into a skin color calculated by the means for calculating.

According to a twenty-first aspect of the present invention, in any one of aspects 18 to 20, there is provided a storage medium which is capable of being read by a computer, storing therein a further program for realizing a means for detecting a skin area automatically from the color image.

According to a twenty-second aspect of the present invention, there is provided a storage medium which is capable of being read by a computer, storing therein a program for realizing a means for discriminating lighting light source when a color image is taken photograph on the basis of a color distribution of a skin area of the color image a means for obtaining colors corresponding to a plurality of different lighting light sources when a substance is taken photograph under a plurality of different lighting light sources a means for converting a color of pixel into a color received from the means for obtaining, while receiving a color under prescribed lighting light source corresponding to a color of the pixel from the means for obtaining on the basis of result of discrimination by the means for discriminating and a color of said pixel in the color image.

According to a twenty-third aspect of the present invention, there is provided a storage medium which is capable of being read by a computer, storing therein a program for realizing a means for discriminating lighting light source when a color image is taken photograph on the basis of a color distribution of a skin area of the color image a means for outputting a color under prescribed lighting light source of a color, while receiving the result of discrimination by said means for discriminating and the color of pixel in the color image; and a means for converting a color of the pixel into a, color outputted by the means for outputting.

According to a twenty-fourth aspect of the present invention, there is provided a storage medium which is capable of being read by a computer, storing therein a program for realizing a means for discriminating lighting light source when a color image is taken photograph on the basis of a color distribution of a skin area of the color image a means for calculating a color under prescribed lighting light source of a color on the basis of result of discrimination by the means for discriminating and the color of pixel in the color image, and a means for converting a color of pixel into a color calculated by the means for calculating.

According to a twenty-fifth aspect of the present invention, in any one of aspects 22 to 24, there is provided a storage medium which is capable of being read by a computer storing therein a further program for realizing a means for detecting a skin area automatically from the color image.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

Preferred embodiments of the present invention will be described in detail in accordance with the accompanying drawings.

FIRST EMBODIMENT

Figure 1:
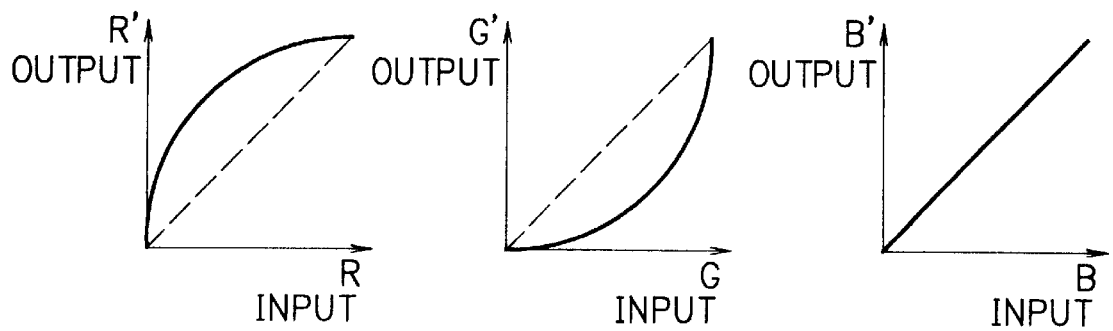
FIG. 1 is an explanation view of a conventional color correction method of a color image.
Figure 2:
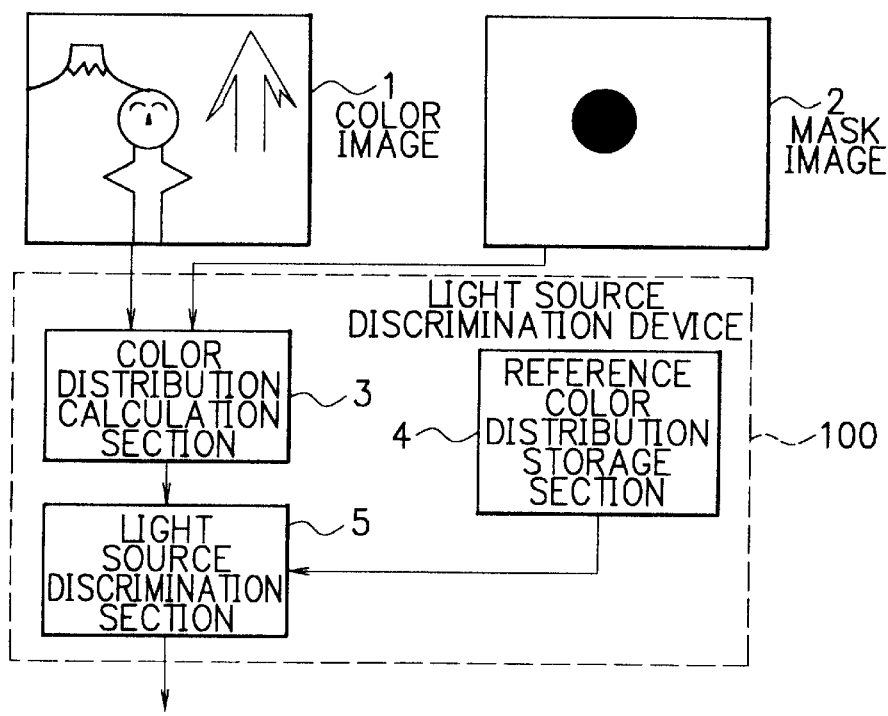
FIG. 2 is a block diagram showing a configuration of a light source discrimination device according to an embodiment.

There will be described a light source discrimination device 100 of color image of an embodiment referring to FIG. 2.

A color image 1 possesses sensor output values (R (x, y), G (x, y), B (x, y)) in every each pixel position (x, y) in an image. A mask image 2 has the same size as that of the color image 1. A value m in each pixel position thereof is a corresponding pixel of face area of the color image 1, as being m(x, y)=1, while a corresponding pixel of no face area is to be m(x, y)=0. The mask image 2 is binary image. A color distribution calculation section 3 calculates distribution of ((R (x, y), G (x, y), B (x, y)) of the color image 1 of the pixel in which the mask image 2 has value "1". For instance, the color distribution calculation section 3 calculates mean value (R0, G0, B0).

Furthermore, there is obtained distribution of sensor output values in answer to the inputs under daylight and fluorescent light in terms of many (N pieces) skin colors beforehand. For instance, there is obtained mean value and covariance matrix of skin color in the daylight by way of (R10, G10, B10) and $\Sigma_1$. Moreover, there is obtained mean value and covariance matrix of skin color in the fluorescent light by way of (R20, G20, B20) and $\Sigma_2$. Here, for instance, the covariance matrixes $\Sigma_1$ is obtained following formula 2.

$$\sum\nolimits_1 = \begin{cases} V_{RR} & V_{RG} & V_{RB} \\ V_{GR} & V_{GG} & V_{GB} \\ V_{RB} & V_{GB} & V_{BB} \end{cases} \quad \text{[FORMULA 2]}$$

$$V_{IJ} = \sum_{n=1}^{N} (I_n - II0)(J_n - JI0)$$

Here, I, J represent color distribution showing any of R, G, and B.

These color distributions are stored in a reference color distribution storage section 4.

A light source discrimination section 5 compares the mean value (R0, G0, B0) of a face color (skin color) obtained from the color distribution calculation section 3 with the color distribution of the face color under respective light sources stored in the reference color distribution storage section 4 to discriminate light source about the time when the image is taken photograph. In the most simplified case, there is compared the mean value of respective color distributions with stored color distribution on its respective Euclid distance, thus being discriminated as corresponding light source to the most nearest distribution. There is calculated these distances using following formula 3. Distance E1 represents distance between the mean value and the daylight, and distance E2 represents distance between the mean value and the fluorescent light. The E1 of the distance of daylight is compared with the E2 of the distance of the fluorescent light, if the relationship of E1 and E2 is of as being E1<E2, there is discriminated that light source is daylight, while if the relationship of E1 and E2 is of as being E1>E2, there is discriminated that light source is fluorescent light.

$$E1 = \sqrt{(R10-R0)^2 + (G10-G0)^2 + (B10-B0)^2}$$

$$E2 = \sqrt{(R20-R0)^2 + (G20-G0)^2 + (B20-B0)^2} \quad \text{FORMULA 3}$$

By way of another method, there is a determination regulations of Bayes. According to Bayes, assuming that respective color distributions are normal distribution, there is obtained probability that mean value obtained from the image belongs to respective distribution in accordance with following formula 4, thus the light source is discriminated from the result thereof. A probability P1 that a light source is daylight, obtained from formula 4 and a probability P2 that a light source is a fluorescent light are in the relationship of as being P1>p2, thus there is discriminated as the light source is daylight, while they are in the relationship of as being P1<P2, thus being discriminated as the light source is a fluorescent light. Further, in the formula 4, x is vector consisting of respective sensor outputs (R, G, B), μ is vector consisting of mean value (R0, G0, B0), and subscripts are to classify respective light sources. Furthermore, r is number of dimensions, here, the number of dimension is three "3".

$$P1 = \frac{1}{(2\pi)^{r/2}|\Sigma_1|^{1/2}} e^{\{-\frac{1}{2}(x-\mu_1)^2 \Sigma_1^{-1}(x-\mu_1)\}}$$ [FORMULA 4]

$$P2 = \frac{1}{(2\pi)^{r/2}|\Sigma_2|^{1/2}} e^{\{-\frac{1}{2}(x-\mu_2)^2 \Sigma_1^{-1}(x-\mu_2)\}}$$

When it is necessary to discriminate further strictly, there is calculated not only mean value of sensor output value, but also covariance matrix of distribution, subsequently, comparing analogous property with the distribution stored in the reference color distribution storage section 4 therebetween, thus it is proper that there is judged a close light source as a light source being in use.

The calculation which the above-described color distribution calculation section 3 performs is implemented in terms of three components of R, G, and B of pixel included in person skin area of the color image 1. The statistical value of distribution stored in the reference color distribution storage section 4 also relates to this three components. However, in many cases, at the scene where actually an image is taken photograph, lighting from the light source does not shine uniformly on a area such as a face, thus shadow occurs. If there is gathered color sample under the reference color distribution is uniform lighting, with the result that state of lighting becomes different. In such the case, since brightness obtained from the image does not aid in order to discriminate the light source, the color distribution calculation section 3 obtains mean chromaticity (r0, g0) by using formula 5.

$$r0 = \frac{R0}{R0+G0+B0}$$ [FORMULA 5]

$$g0 = \frac{G0}{R0+G0+B0}$$

In the formula 5, there is obtained the mean chromaticity from the mean value (R0, G0, B0) of the three components, however, there can be obtained a mean chromaticity in such a way that there is obtained a chromaticity (r(x, y), g(x, y)) of respective pixels from formula 6, subsequently obtaining mean value thereof too.

$$r(x, y) = \frac{R(x, y)}{R(x, y) + G(x, y) + B(x, y)}$$ [FORMULA 6]

$$g(x, y) = \frac{G(x, y)}{R(x, y) + G(x, y) + B(x, y)}$$

In this case, there should be stored mean value (r10, g10) or (r20, g20), and covariance matrices $\Sigma_1, \Sigma_2$ in the reference color distribution storage section 4 in terms of the chromaticity from three components obtained under respective light sources about many (N pieces of) skin colors. The light source discrimination section 5 performs calculation of distance or probability similar to the case of three components to discriminate a light source from the calculation result. Further, the covariance matrix of two components is calculated from for instance, formula 7. Furthermore, when there is performed calculation of probability by the formula 4, value of number of dimensions r becomes 2.

$$\sum\nolimits_1 = \begin{Bmatrix} V_{rr} & V_{rg} \\ V_{gr} & V_{gg} \end{Bmatrix}$$ [FORMULA 7]

$$V_{IJ} = \sum_{n=1}^{N}(I_n - I10)(J_n - J10)$$

Here, I, J are color distribution denoting any of r, g.

Here, statistical values of light source stored in the reference color distribution storage section 4 are two kinds in order to simplify the explanation. The kind is not limited to two kinds. In accordance with kind of light source to be supposed, it is proper that kind of light source is of three kinds for instance, daylight, a tungsten-light, and a fluorescent light, further fluorescent light is divided in further detail into three classes, thus resulting in five kinds in total. Thus according to the light source discrimination device, it is capable of being discriminated kind of the light source without changing configuration itself, even though there is increased kind of the light source to be supposed.

Figure 3:
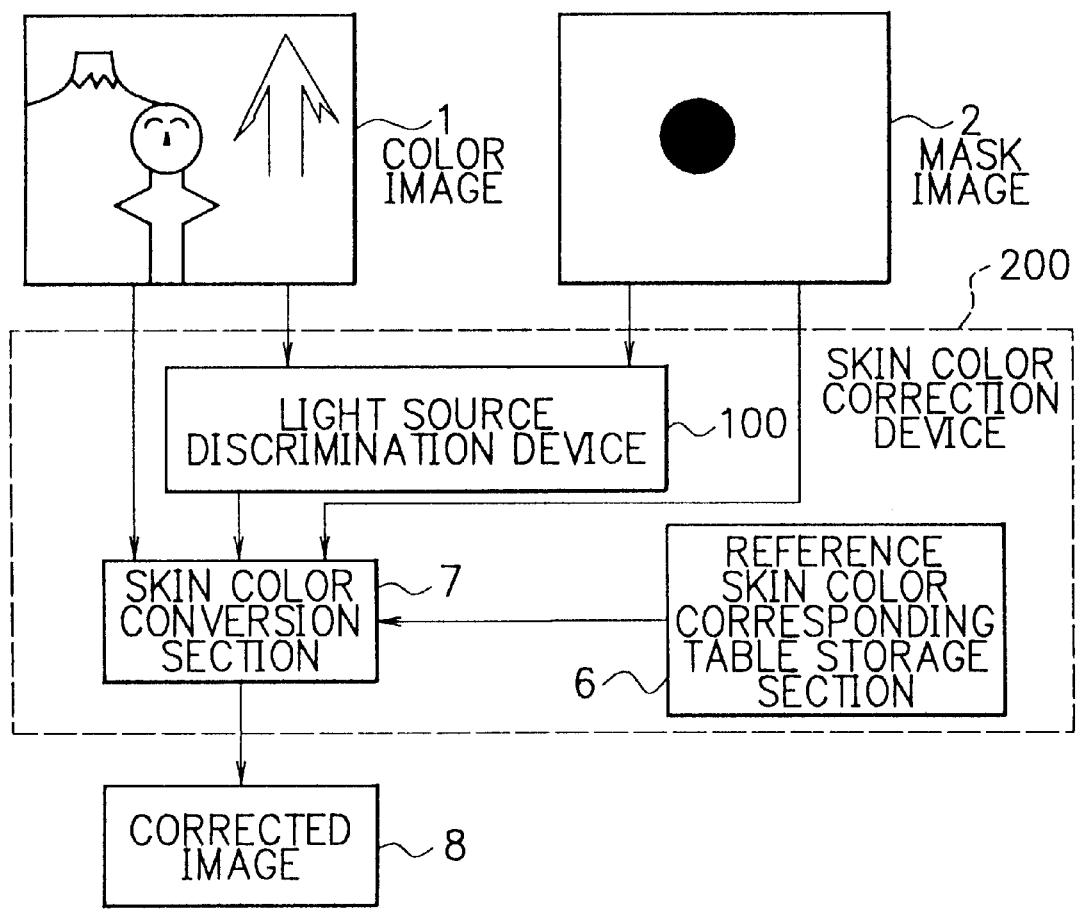
FIG. 3 is a block diagram showing a configuration of a skin color correction device according to a first embodiment.

FIG. 3 is a block diagram showing a configuration of a skin color correction device according to a first embodiment. There will be described a skin color correction device 200 referring to FIG. 3.

The skin color correction device 200 includes above described the light source discrimination device 100 therein. Here, supposing that the light source by which the image is taken photograph is the fluorescent light in the light source discrimination device 100 for the sake of convenience. From the discrimination result, the skin color correction device 200 corrects skin color portion of the color image 1 into color of image taken photograph under daylight. There are stored, for instance, three output value (R1n, G1n, B1n) under daylight, and three output value (R2n, G2n, B2n) under fluorescent light (here n=1, 2, . . . , N) in a reference skin color corresponding table storage section 6 about N pieces of the skin color. A skin color conversion section 7 checks pixel value corresponding mask image 2 in terms of respective pixels of the color image 1, when the value is "1", thus comparing pixel value (R(x, y), G(x, y), B(x, y)) with N pieces of skin color under fluorescent light stored in the reference skin color corresponding table storage section 6. When the most closest color is (R2n, G2n, B2n), there is outputted value (R1n, G1n, B1n) under daylight corresponding thereto by way of pixel value of corrected image 8. For that reason, there can be obtained the corrected image 8 that color is corrected into color under daylight about skin color portion within the color image 1 taken photograph under fluorescent light.

In the above described example, there are stored respective sensor output (R, G, B) under respective light sources about N pieces of skin color in the reference skin color corresponding table storage section 6. However, in accordance with the reason described before, if only the values under uniform lighting are stored therein, there are cases where the color close to three components of the image taken photograph actually is not appropriate. In this case, there is constituted that chromaticity (rn, gn) under respective light sources about N pieces of skin color is stored in the respective skin color corresponding table storage section 6. The skin color conversion section divides pixel value of the color image 1 into lightness L(x, y) and chromaticity (r(x, y), g(x, y)). Calculation of chromaticity becomes same constitution of the formula 6. It is suitable that lightness is to preserve the other one independent component of (R(x, y), G(x, y), B(x, y)) with constitution of simple increase function of three components. For instance, there is calculated the independent lightness L(x, y) in accordance with formula 8 to be preserved.

$$L(x,y)=R(x, y)+G(x, y)+B(x, y) \qquad \text{FORMULA 8}$$

Then, there is performed a comparison with the chromaticity of N pieces of skin color under fluorescent light. When the most closest one is (r2n, g2n), there is converted it into corresponding skin color (r1n, g1n) under daylight. The lightness is to be used the preserved L(x, y), and there is calculated three components of the corrected image 8 in accordance with formula 9.

$$\begin{cases} R(x, y) = r(x, y)L(x, y) \\ G(x, y) = g(x, y)L(x, y) \\ B(x, y) = (1 - r(x, y) - g(x, y))L(x, y) \end{cases} \quad \text{[FORMULA 9]}$$

As described-above, the skin color correction device 200 is constituted.

There will be described color image correction device 300 according to the embodiment of the present invention referring to FIG. 4.

Essentially, if the image is taken photograph under the fluorescent light, not only skin color, but also the others must be different from color taken photograph under daylight. The color image correction device 300 different from the above skin color correction device 200, performs color correction not only skin area of the color image 1, but also the whole image.

The reference color corresponding table storage section 9 stores therein, for instance, sensor output value (R1n, G1n, B1n) under daylight and sensor output value (R2n, G2n, B2n) under the fluorescent light (n=1, 2, . . . , N) of the representative N pieces of subject taken photograph generally. The color conversion section 10, when there is discriminated the discrimination output of the light source discrimination device 100 as the light source of the color image 1 to be the fluorescent light, retrieves the most closest one (R2n, G2n, B2n) from N pieces of sensor output value under the fluorescent light of the reference color corresponding table storage section 9 about respective pixel values (R(x, y), G(x, y), B(x, y)) of the color image 1, and there is taken the corresponding sensor output value (R1n, G1n, B1n) under daylight to be value of pixel in the corrected image 8. Thus the color image correction device 300 differs from the skin color correction device 200 in that there is utilized the content of the mask image 2 for only discriminating the light source, thus correcting color of the whole image in answer to the light source discriminated previously.

In the above described skin color correction device 200, the skin color conversion section retrieves the most closest sensor output value in every pixel of skin area from N pieces of the sensor output value of the reference skin color corresponding table storage section 6. In the color image correction device 300, a color conversion section 10 retrieves the most closest sensor output value in every pixel from N pieces of the sensor output values under corresponding light source of the reference color corresponding table storage section 9. There is taken the sensor output value retrieved previously to be corresponding sensor output value under the light source which is to be object. Thus, there is created the corrected image 8 by converting the sensor output value in every pixel.

SECOND EMBODIMENT

In the above-described first embodiment, when N is large number, there is required executing time incapable of being disregarded, because it is necessary to compare value of three components or two components in every respective pixels with N pieces of values. In this second embodiment, it causes the executing time to be short.

Figure 5:
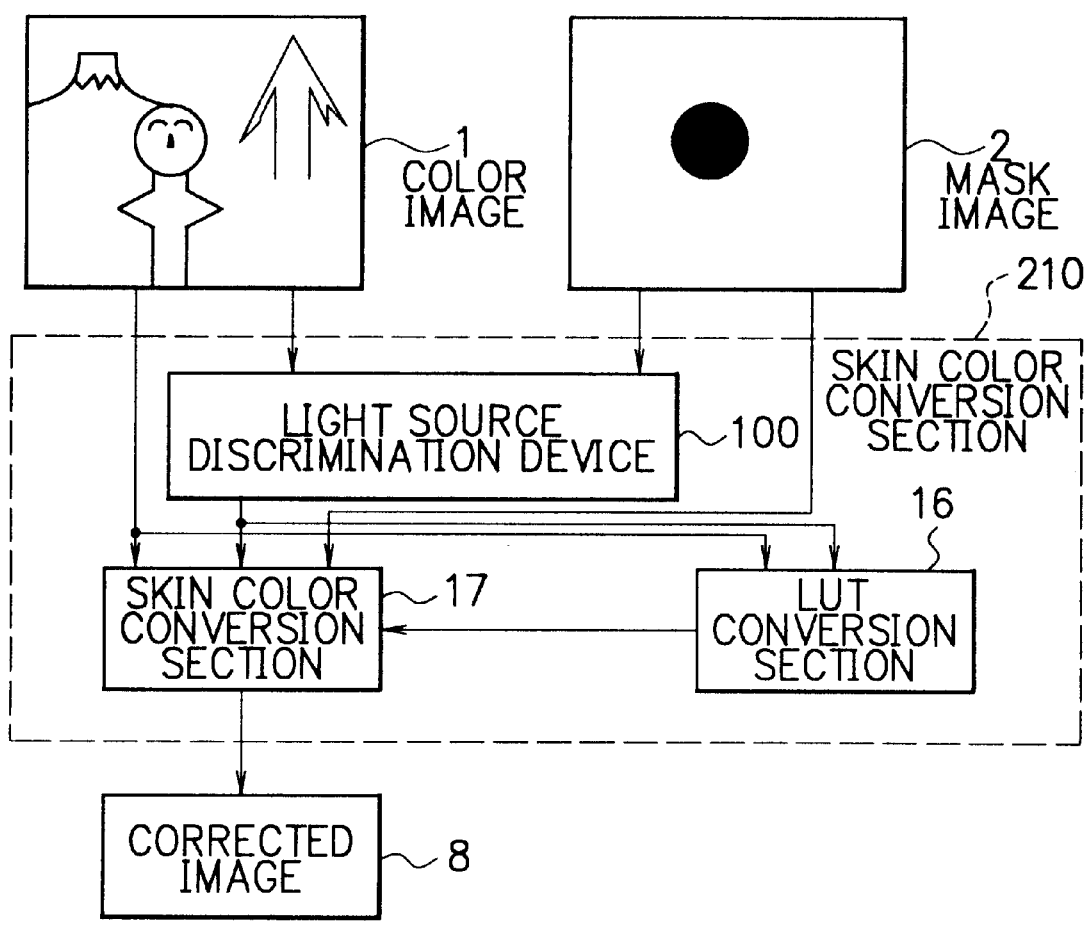
FIG. 5 is a block diagram showing a configuration of a skin color correction device according to a second embodiment.

There will be described a skin color correction device 210 according to the second embodiment referring to FIG. 5.

Here, output of the light source discrimination device 100 is applied to a skin color conversion section 17 and a LUT (look up table) conversion section 16. Further, also respective pixel values of the color image 1 are applied to the skin color conversion section 17 and the LUT (look up table) conversion section 16. The LUT conversion section 16 is a storage device which is accessed with output of the light source discrimination device 100 and pixel value of the color image 1 as address, and whose address stores therein corresponding correction value thereto. For instance, the color image 1 is denoted in respective every four bits of R, G, B, and the output of the light source discrimination device 100 is denoted by one bit that when it is daylight, the bit takes "0", while when it is fluorescent light, the bit takes "1", the LUT conversion section 16 is the storage device of at least size of 8192 in which there can be represented using address of 13 bits. Respective addresses possess corrected R, G, B values in answer to respective inputs. For instance, assuming that there is corrected the image to an image taken photograph under daylight lastly, when an output of the light source discrimination device 100 is "0", since it is unnecessary to correct color, values of 0 to 4095 are stored in addresses of 0 to 4095 beforehand, and R, G, B values under daylight corresponding to R, G, B values under fluorescent light are stored in addresses 4096 to 8191.

The skin color conversion section 17 checks value of the mask image 2 in every pixel position. When the value of the mask image 2 is "0", pixel value of the color image 1 is taken to be pixel value of the corrected image 8 as it is. When the value of the mask image 2 is "1", there is taken R, G, B value obtained from the LUT conversion section 16 to be pixel value of the corrected image 8. The constitution shown in FIG. 5 differs from the constitution shown in FIG. 3. In the constitution of FIG. 5, it is unnecessary to retrieve color to which sensor output is the most closest in every respective pixels, thereby it is capable of being executed processing in high speed. However, there is a problem that in this skin color correction device 210, when the color image 1 is expressed by respective 8 bits of R, G, B, a storage domain which is necessary for the LUT conversion section 16 becomes too large.

However, there is avoided this problem in such a way that it causes well-known technique to be adopted to the LUT conversion section 16. Such well-known technique is that there is stored correction value in a look up table about only respective high order 4 bits of R, G, B, thus complementing low order 4 bits from adjacent values.

There will be described a color image correction device 310 according to the second embodiment referring to FIG. 6.

Figure 4:
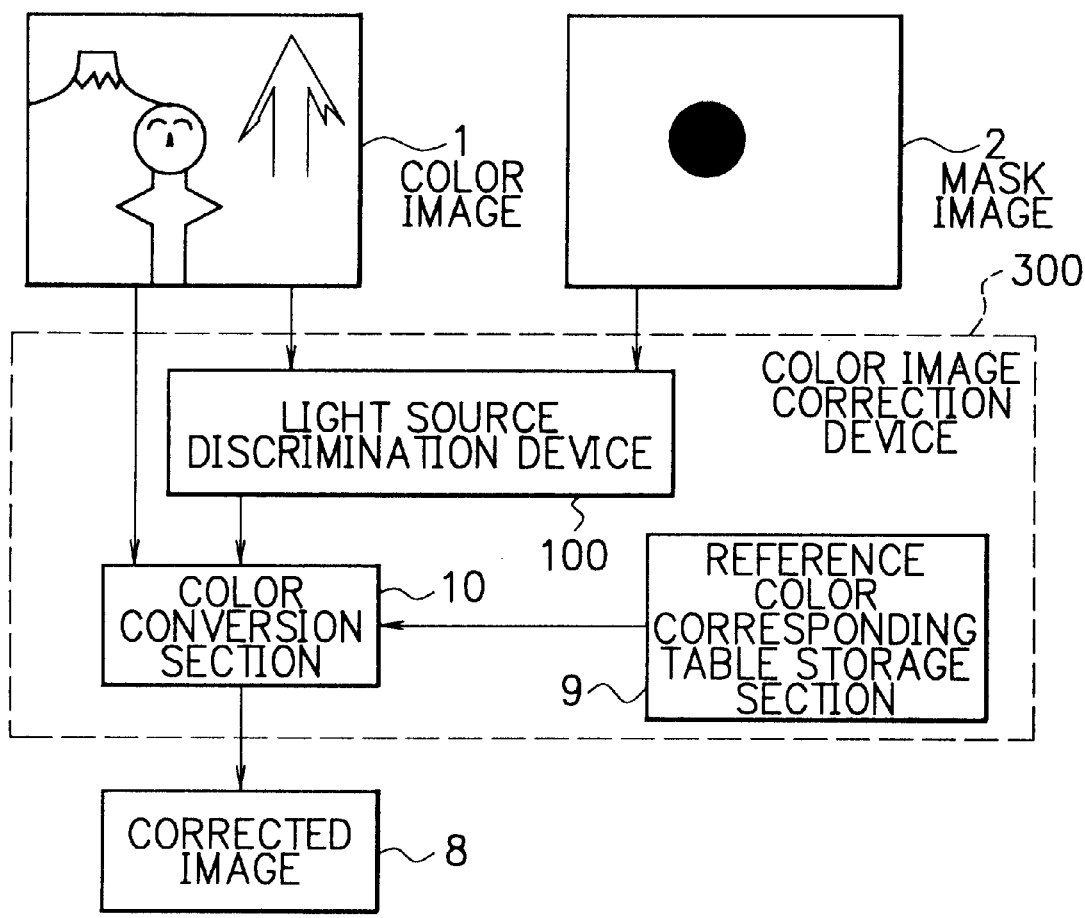
FIG. 4 is a block diagram showing a configuration of a color image correction device according to the first embodiment.

The color image correction device 310 is provided with a LUT conversion section 19 in stead of the reference color corresponding table storage section 9 in FIG. 4. This is the same case as that of above-described skin color correction device 210, thus description will be omitted accordingly. However, the color image correction device 310 differs from the skin color correction device 210 in that the color image correction device 310 corrects not only the skin area within the image, but also the whole color of the color image 1. For that reason, it is unnecessary to check value of the mask image in every pixel. With the result that there is not provided a constitution corresponding to the skin color conversion section 17 of the skin color correction device 210.

THIRD EMBODIMENT

Figure 7:
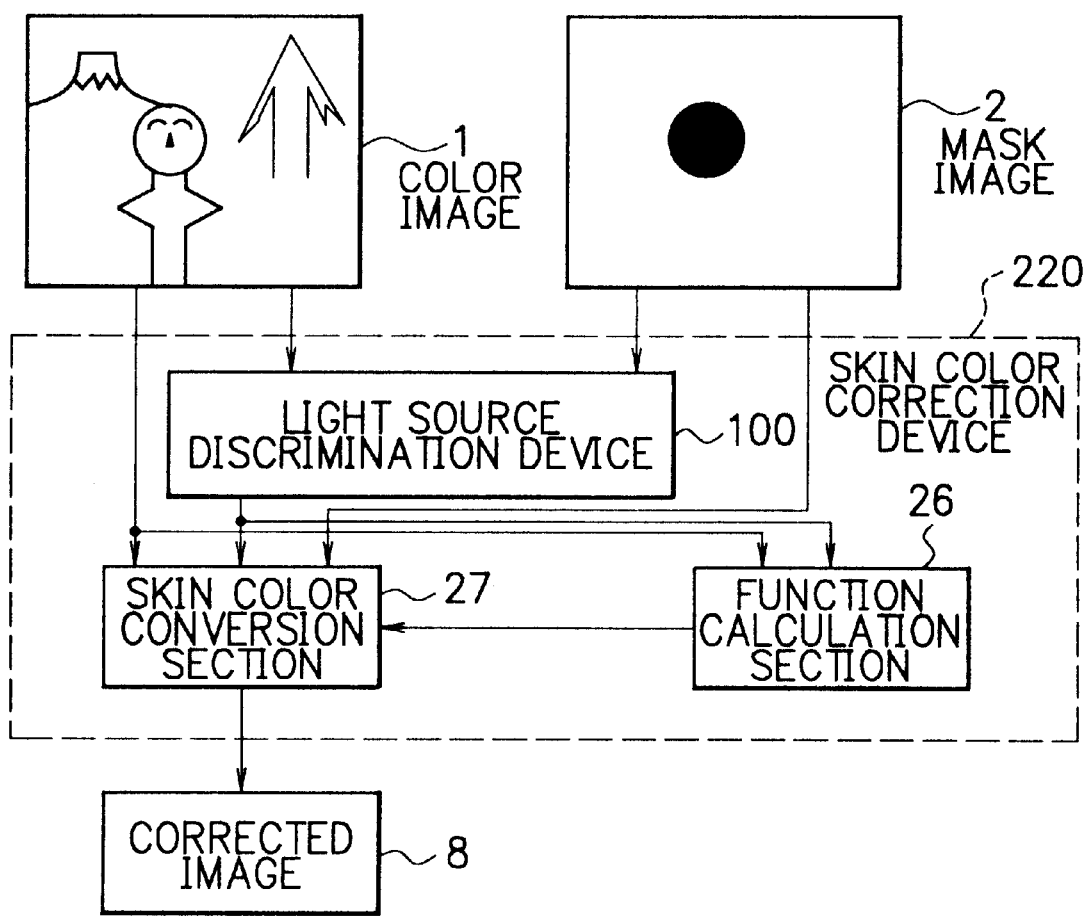
FIG. 7 is a block diagram showing a configuration of a skin color correction device according to a third embodiment.

There will be described a skin color correction device 220 according to a third embodiment referring to FIG. 7.

The skin color correction device 220 is provided with a function calculation section 26 and a skin color conversion section 27 in stead of the LUT conversion section 16 and the skin color conversion section 17 of the above-described skin color correction device 210. The output of the light source discrimination device 100 is applied to the function calculation section 26 and the skin color conversion section 27. Further, respective pixel values of the color image 1 are also applied to the function calculation section 26 and the skin color conversion section 27. The function calculation section 26 converts pixel value of the color image 1 into corrected value, while selecting conversion function in accordance with output of the light source discrimination device 100. For instance, pixel value R, G, B, obtained under fluorescent light is converted into pixel value R', G', B', under daylight by linear formula 10.

$$\begin{bmatrix} R' \\ G' \\ B' \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R \\ G \\ B \end{bmatrix} \quad \text{[FORMULA 10]}$$

The coefficient $a_{ij}$ in the formula 10 is selected from the output (discrimination result of the light source) of the light source discrimination device 100. For instance, a coefficient for converting pixel value R, G, B, obtained under fluorescent light into pixel value R', G', B', under daylight generally has complicated value as described above. When the image is an image taken photograph under daylight originally, this matrix is unit matrix of 3×3. Further, the conversion function is not always linear function described above, in many cases, it is non-linear function.

The skin color conversion section 27 checks value of the mask image 2 in every pixel position, when it is "0", pixel value of the color image 1 is taken to be pixel value of the corrected image 8 as it is. When a value of the mask image 2 is "1", there is taken R, G, B, value obtained from the function calculation section 26 to be pixel value of the corrected image 8. The constitution shown in FIG. 7 is the same as that of the constitution shown in FIG. 5 (the skin color correction device 210 of the second embodiment). In the constitution of FIG. 7, it is unnecessary to retrieve color to which sensor output is the most closest in every respective pixels, in this connection, it is capable of being executed processing in high speed. In addition thereto, it is unnecessary to prepare large storage domain such as the constitution of FIG. 5.

Figure 8:
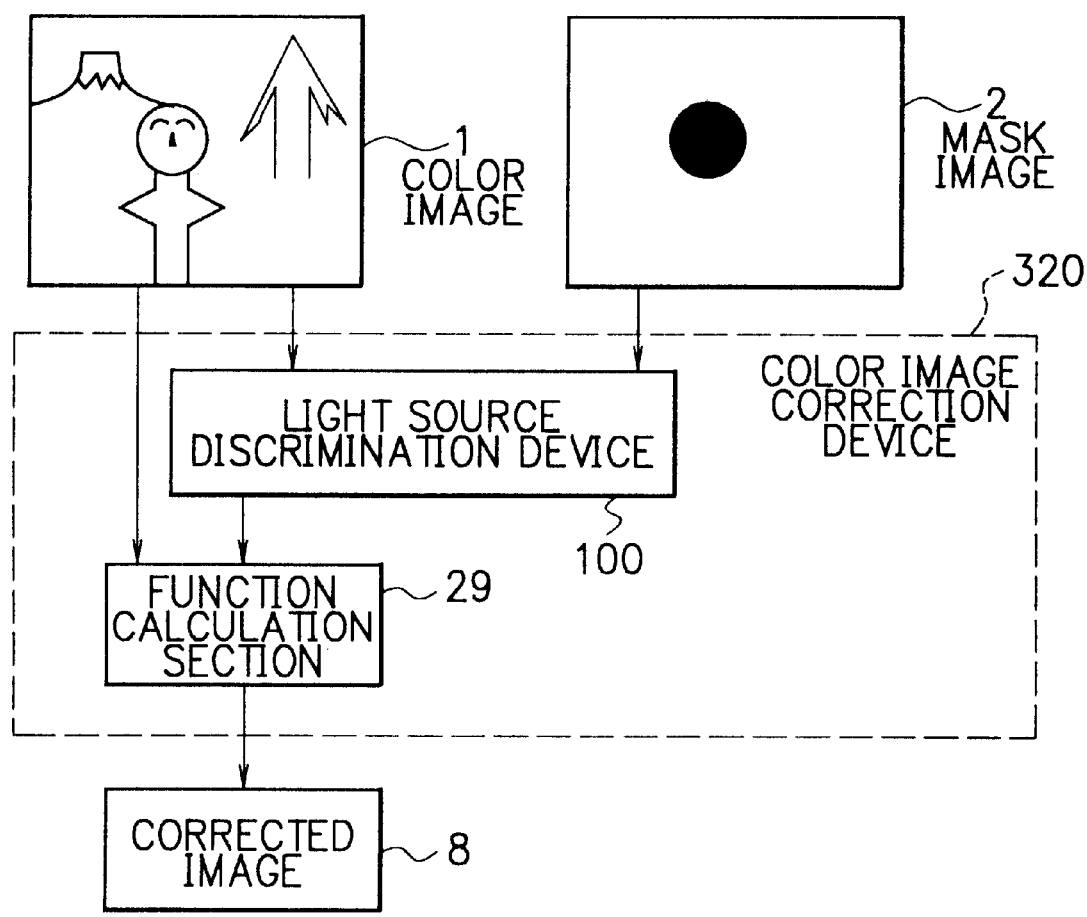
FIG. 8 is a block diagram showing a configuration of a color image correction device according to the third embodiment.

There will be described a color image correction device 320 according to a third embodiment referring to FIG. 8.

Figure 6:
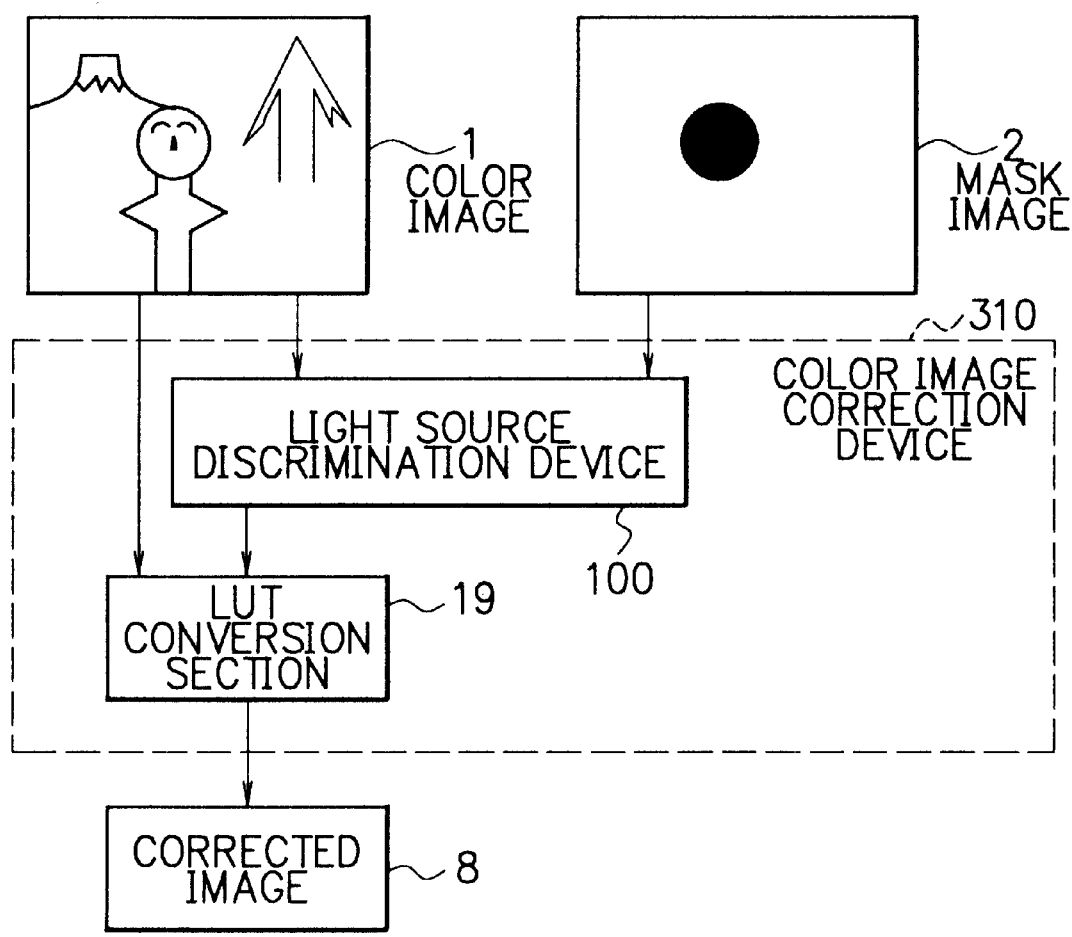
FIG. 6 is a block diagram showing a configuration of a color image correction device according to the second embodiment.

The color image correction device 320 is provided with a function calculation section 29 in stead of the LUT conversion section 19 in FIG. 6. This case is the same as that of the skin color correction device 220, thus description thereof will be omitted. However, the color image correction device 320 differs from the skin color correction device 220 in that the color image correction device 320 corrects not only the skin area within the image, but also the whole color of the color image 1. For that reason, it is unnecessary to check value of the mask image in every pixel. With the result that there is not provided a constitution corresponding to the skin color conversion section 27 of the skin color correction device 220.

FOURTH EMBODIMENT

There will be described skin color correction device according to a fourth embodiment referring to FIG. 9. The skin color correction device 500 causes a skin area detection section 400 to be added to the skin color correction device 200. The skin area detection section 400 detects area of the skin automatically from the color image 1. For that reason, hereinafter, the skin color correction device 500 is called as an automatic skin color correction device 500. For instance, the skin area detection section 400 finds characteristic components in face such as the eyes or the mouth in the color image 1, subsequently, there is detected area including this characteristic by way of face area, that is taken to be skin color area as described in the literature: "Detection of Face Image based on Face Structure Model" by Kawakami, Miyatake, and Oota 37-th Information Processing Society National Convention pp. 1508 to 1509, 1988. The skin area detection section 400 checks color of respective pixels in the color image 1, so that there is detected area where pixel close to skin color collects by way of skin area as described in the literature: "Area Division of Color Image using Color Information" by Miyawaki, Ishibashi, and Kishino. Electronic Information Communication Society Research Report, IE89-50, 1989. In position of pixel belonging to detected skin area, there is written value of "1"to the mask image 2. On account of this matter, there is implemented discrimination of the light source, and further correction of the skin color while creating mask image 2 automatically.

At the present time, it is difficult to detect area of the skin automatically from the image under the whole conditions.

However, it is capable of being detected automatically area of the skin surely in the cases where only one face is taken photograph in the image or there does not exist color close to skin color in the image. Furthermore in the present invention, since there is discriminated the light source while utilizing the matter that skin color is taken photograph differently caused by difference of lighting light, in many cases, it is capable of being detected skin area depending on color, by supposing broad range of the skin color, if there is no color close to the skin color in the image at the time of skin detection, although, skin color is distributed in broad range in the stage where lighting light is unknown. Moreover, in the present embodiment, whose constitution is the same as that of the skin color correction device 200 with the exception of the skin area detection section 400 of the automatic skin color correction device 500. However, it is suitable that the skin area detection section 400 is added to the skin color correction device 210 or the skin color correction device 220.

Figure 10:
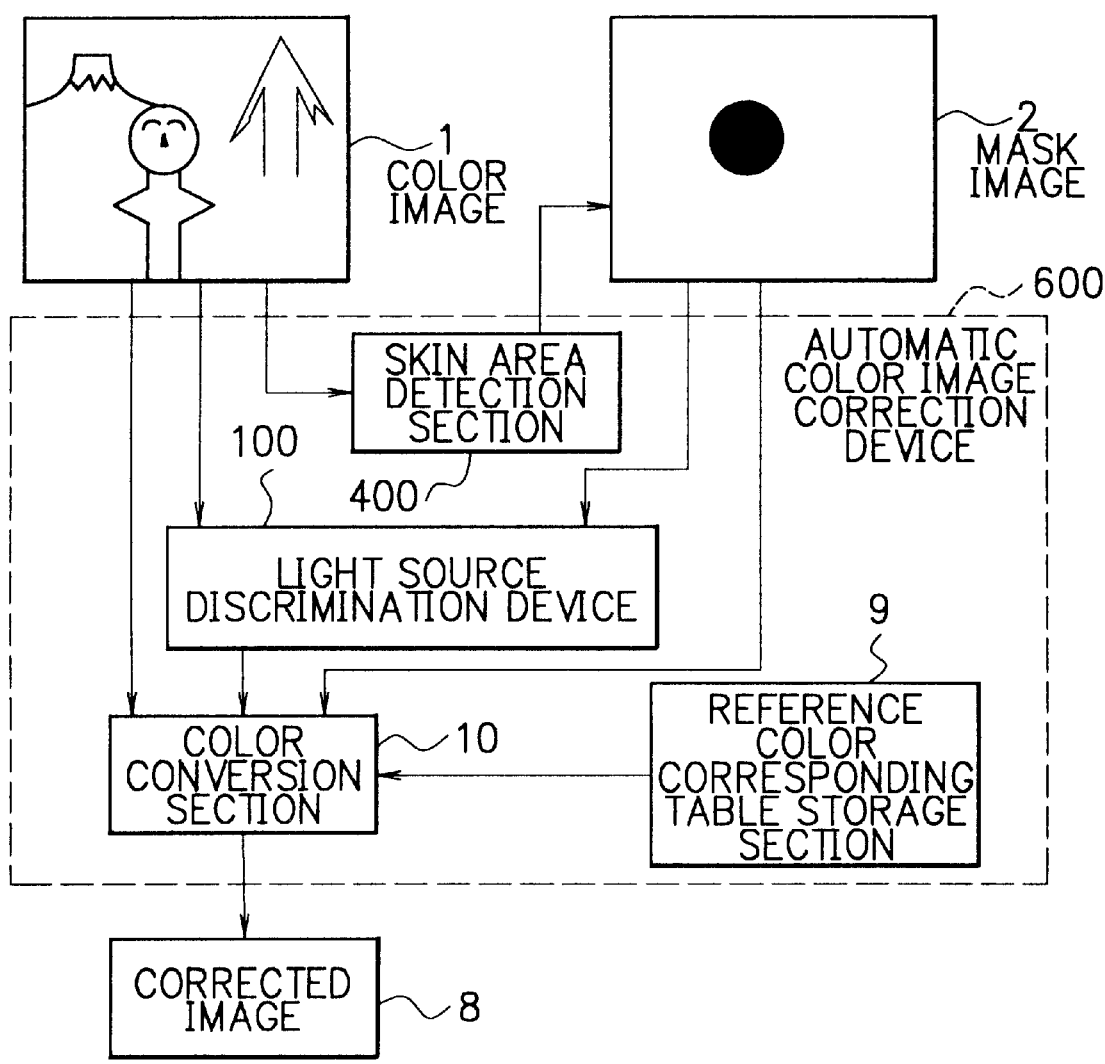
FIG. 10 is a block diagram showing a configuration of an automatic color image correction device according to the fourth embodiment.

There will be described a color image correction device 600 according to the fourth embodiment referring to FIG. 10.

Figure 9:
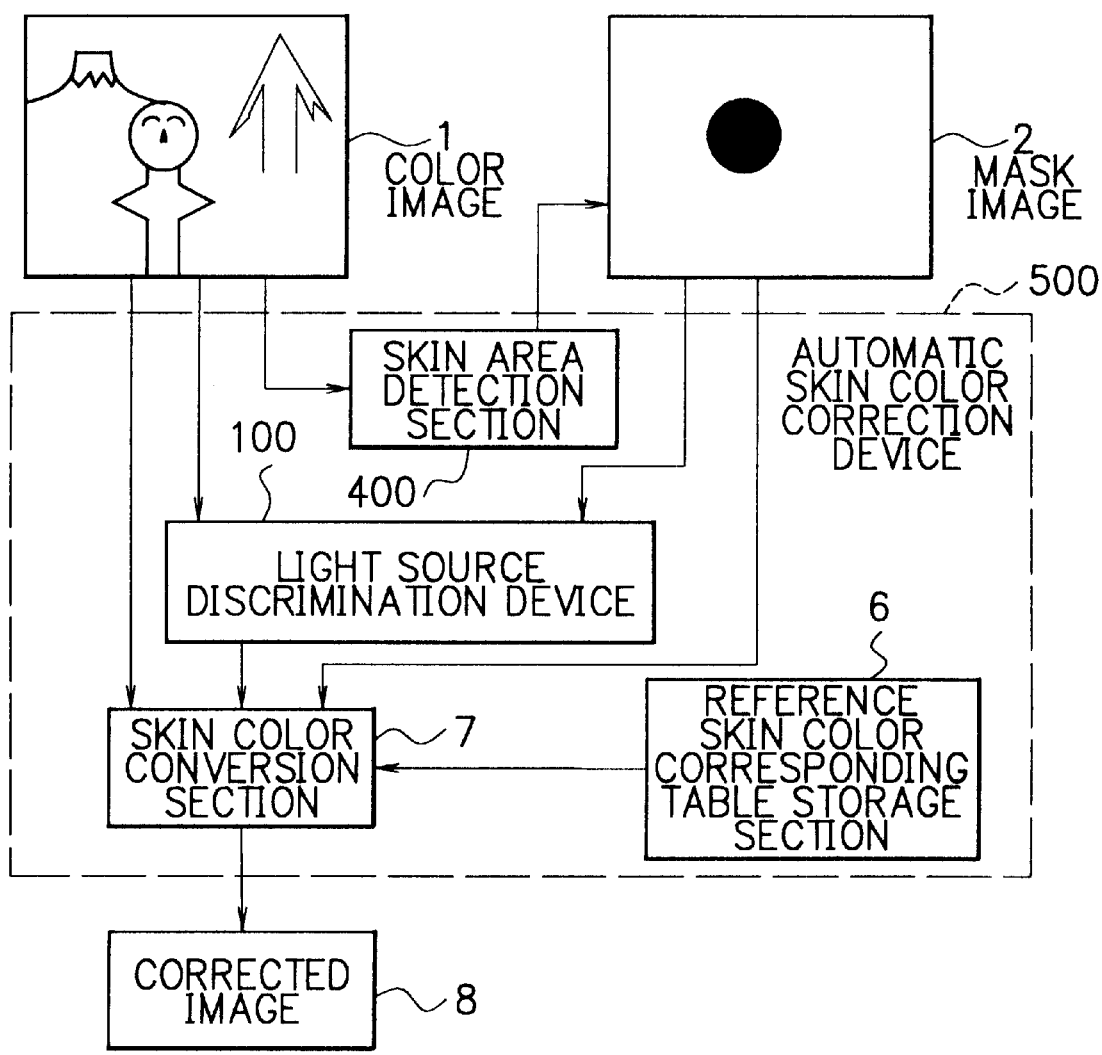
FIG. 9 is a block diagram showing a configuration of an automatic skin color correction device according to a fourth embodiment.

The color image correction device 600 automatically forms a mask image 2 by the skin area detection section 400, that is the same as the skin color correction device 500 shown in FIG. 9. For that reason, the color image correction device is called as the automatic color image correction device 600. However, the automatic color image correction device 600 differs from the automatic color image correction device 500 in that the automatic color image correction device 600 corrects color of the whole color image 1 based on the color of the area (skin area) detected by the mask image 2. Further, the automatic color image correction device 600 has the same constitution as that of the color image correction device 300 with the exception of the skin area detection section 400 of the automatic color image correction device 600. Suitable constitution is that the skin area detection section 400 is added to the color image correction device 310 or the color image correction device 320.

There can be realized the above described light source discrimination device, the skin color correction device in respective embodiments, and the color image correction device by loading program enabling operation (processing) of the above described respective sections to be realized to a computer. The program is suitable to be distributed widely while recording it to storage medium such as CD-ROM or optical magnetic disk and so forth. The program is suitable to be distributed through some communication means (for instance, public network).

As described above, according to the present invention, there is discriminated the light source at the time when the image is taken photograph from the skin area of the color image, thus correcting color of partial area (skin area) in the color image or color of the whole area into color under the predetermined light source. For that reason, regardless of kind of light source when the color image is taken photograph, it is always capable of being maintained highly reproducibility of color of area to be target.

While preferred embodiments of the invention have been described using specific terms, such description is for illustrative purpose only, and it is to be understood that changes and variations may be made without departing from the spirit or scope of the following claims.

What is claimed is:

1. A light source discrimination method comprising:
   calculating a color distribution of a skin area of a photographed color image;
   comparing said color distribution with a plurality of known color distributions of skin photographed under a plurality of different light sources; and
   discriminating a light source under which said photographed color image was photographed, based on a result of comparing said first color distribution with said plurality of known color distributions.

2. A light source discrimination device comprising:
   a color distribution calculation means for calculating a color distribution of a skin area of a photographed color image;
   a reference color distribution storage means for storing therein a plurality of known color distributions of skin photographed under a plurality of different light sources; and
   a light source discrimination means for discriminating a light source under which said photographed color image was photographed by comparing said color distribution of said skin area of said photographed color image with said plurality of known color distributions of skin photographed under said plurality of different light sources.

3. A skin color correction method comprising:
   calculating a color distribution of a skin area of a photographed color image;
   comparing said color distribution with a plurality of known color distributions of skin photographed under a plurality of different light sources; and
   correcting an original color of said skin area into a corrected skin color under a prescribed light source based on a result of the comparison.

4. A skin color correction method as claimed in claim 3, wherein correcting said color of said skin area is based on a result of discriminating a light source under which said photographed color image was photographed.

5. A skin color correction method as claimed in claim 4, wherein the method further comprises detecting said skin area of said photographed color image automatically.

6. A skin color correction method as claimed in claim 3, wherein the method further comprises detecting said skin area of said photographed color image automatically.

7. A color image correction method comprising:
   calculating a color distribution of a skin area of a photographed color image;
   comparing said color distribution with a plurality of known color distributions of skin photographed under a plurality of different light sources; and
   correcting a color of the one or more pixels in said photographed color image according to a prescribed light source based on a result of the comparison.

8. A color image correction method as claimed in claim 7, wherein correcting the color of the one or more pixels in said photographed color image is based on a result of discriminating a light source under which said photographed color image was photographed.

9. A color image correction method as claimed in claim 8, wherein the method further comprises detecting said skin area of said photographed color image automatically.

10. A color image correction method as claimed in claim 7, wherein the method further comprises detecting said skin area of said photographed color image automatically.

11. A skin color correction device comprising:
- a light source discrimination means for discriminating a light source at the time when a color image is photographed on the basis of a color distribution of a skin area of said color image;
- a skin color storage means for storing therein a plurality of skin colors corresponding to a plurality of light sources when skin is photographed under a plurality of different light sources; and
- a skin color conversion means for converting an original skin color of said skin area into a new skin color from said skin color storage means based on a result of discrimination of said light source discrimination means and based on the original skin color of said skin area.

12. A skin color correction device as claimed in claim 11, further comprising a skin area detection means for detecting the skin area automatically from said color image.

13. A skin color correction device comprising:
- a light source discrimination means for discriminating a light source when a color image is photographed based on a color distribution of a skin area of said color image;
- a skin color output means for outputting a new skin color under a prescribed light source based on a result of discrimination of said light source discrimination means and based on an original skin color of said skin area; and
- a skin color conversion means for converting the original skin color of said skin area into the new skin color outputted from said skin color output means.

14. A skin color correction device as claimed in claim 13, further comprising a skin area detection means for detecting the skin area automatically from said color image.

15. A skin color correction device comprising:
- a light source discrimination means for discriminating a light source when a color image is photographed based on a color distribution of a skin area of said color image;
- a skin color calculation means for calculating a new skin color under a prescribed light source based on a result of discrimination of said light source discrimination means and based on an original skin color of said skin area; and
- a skin color conversion means for converting the original skin color of said skin area into the new skin color calculated by said skin color calculation means.

16. A skin color correction device as claimed in claim 15, further comprising a skin area detection means for detecting the skin area automatically from said color image.

17. A color image correction device comprising:
- a light source discrimination device for discriminating a light source when a color image is photographed based on a color distribution of a skin area of said color image;
- a reference color storage means for storing therein a plurality of colors corresponding to a plurality of light sources when a substance is photographed under the plurality of light sources; and
- a color conversion means for converting an original color of at least one pixel of said color image into a new color from said reference color storage means based on a result of discrimination of said light source discrimination means and based on the original color of said at least one pixel in said color image.

18. A color image correction device as claimed in claim 17, further comprising a skin area detection means for detecting said skin area automatically from said color image.

19. A color image correction device comprising;
- a light source discrimination means for discriminating a light source when a color image is photographed based on a color distribution of a skin area of said color image;
- a color output means for outputting a new color under a prescribed light source based on a result of discrimination of said light source discrimination means and based on an original color of at least one pixel of said color image; and
- a color conversion means for converting the original color of said at least one pixel into the new color outputted by said color output means.

20. A color image correction device as claimed in claim 19, further comprising a skin area detection means for detecting said skin area automatically from said color image.

21. A color image correction device comprising:
- a light source discrimination means for discriminating a light source when a color image is photographed based on a color distribution of a skin area of said color image;
- a color calculation means for calculating a new color under a prescribed light source based on a result of discrimination of said light source discrimination means and based on an original color of at least one pixel in said color image; and
- a color conversion means for converting the original color of said at least one pixel into the new color calculated by said color calculation means.

22. A color image correction device as claimed in claim 21, further comprising a skin area detection means for detecting said skin area automatically from said color image.

23. A storage medium which is capable of being read by a computer, storing therein a control program causing an image correction apparatus to perform a process comprising:
- calculating a color distribution of a skin area of a photographed color image;
- obtaining a plurality of color distributions of skin photographed under a plurality of different light sources; and
- discriminating a light source under which said color image was photographed by comparing the color distribution of the skin area of said color image with said plurality of color distributions.

24. A storage medium which is capable of being read by a computer, storing therein a control program causing an image correction apparatus to perform a process comprising:
- discriminating a light source when a color image is photographed based on a color distribution of a skin area of said color image;
- obtaining a plurality of skin colors corresponding to a plurality of different light sources when skin is photographed under the plurality of different light sources; and
- converting an original skin color of the skin area into a new skin color from among the plurality of skin colors based on a result of said discrimination and based on the original skin color of said skin area.

25. The storage medium which is capable of being read by a computer as claimed in claim 24, wherein said control program further causes said apparatus to perform a process comprising detecting said skin area automatically from said color image.

26. A storage medium which is capable of being read by a computer, storing therein a control program causing an image correction apparatus to perform a process comprising:

discriminating a light source when a color image is photographed based on a color distribution of a skin area of said color image;

outputting a new skin color under a prescribed light source based on a result of said discrimination and based on an original skin color of said skin area; and converting the original skin color of said skin area into the new skin color.

27. The storage medium which is capable of being read by a computer as claimed in claim 26, wherein said control program further causes said apparatus to perform a process comprising detecting said skin area automatically from said color image.

28. A storage medium which is capable of being read by a computer, storing therein a control program causing an image correction apparatus to perform a process comprising:

discriminating a light source when a color image is photographed based on a color distribution of a skin area of said color image;

calculating a new skin color under a prescribed light source based on a result of said discrimination and based on an original skin color of said skin area; and converting the original skin color of said skin area into the new skin color.

29. The storage medium which is capable of being read by a computer as claimed in claim 28, wherein said control program further causes said apparatus to perform a process comprising detecting said skin area automatically from said color image.

30. A storage medium which is capable of being read by a computer, storing therein a control program that causes an image correction apparatus to perform a process comprising:

discriminating a light source when a color image is photographed on the basis of a color distribution of a skin area of said color image;

obtaining a plurality of colors corresponding to a plurality of different light sources when a substance is photographed under a plurality of different light sources; and converting a color of at least one pixel of said color image into one of said plurality of colors based on a result of said discrimination and based on the color of the at least one pixel in said color image.

31. A storage medium which is capable of being read by a computer as claimed in claim 30, wherein the process further comprises detecting the skin area automatically from said color image.

32. A storage medium which is capable of being read by a computer, storing therein a control program causing an image correction apparatus to perform a process comprising:

discriminating a light source when a color image is photographed on the basis of a color distribution of a skin area of said color image;

outputting a new color under a prescribed light source based on a result of said discrimination and based on a color of at least one pixel in said color image; and converting said color of said at least one pixel into the new color.

33. A storage medium which is capable of being read by a computer as claimed in claim 32, wherein the process further comprises detecting the skin area automatically from said color image.

34. A storage medium which is capable of being read by a computer, storing therein a control program causing an image correction apparatus to perform a process comprising:

discriminating a light source when a color image is photographed on the basis of a color distribution of a skin area of said color image;

calculating a new color under a prescribed light source based on a result of said discrimination and based on a color of a pixel in said color image; and converting the color of the pixel into the new color.

35. A storage medium which is capable of being read by a computer as claimed in claim 34, wherein the process further comprises detecting the skin area automatically from said color image.

* * * * *